US012141760B2

(12) United States Patent
Seck et al.

(10) Patent No.: US 12,141,760 B2
(45) Date of Patent: Nov. 12, 2024

(54) SYSTEMS AND METHODS FOR OPTIMIZING INCIDENT RESOLUTION

(71) Applicant: Capital One Services, LLC, McLean, VA (US)

(72) Inventors: Mohamed Seck, McLean, VA (US); Louis Buell, McLean, VA (US); Bret Sebastian, McLean, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 286 days.

(21) Appl. No.: 17/670,876

(22) Filed: Feb. 14, 2022

(65) Prior Publication Data

US 2023/0259891 A1     Aug. 17, 2023

(51) Int. Cl.
*G06Q 10/20* (2023.01)
*G06N 3/044* (2023.01)

(52) U.S. Cl.
CPC ............. *G06Q 10/20* (2013.01); *G06N 3/044* (2023.01)

(58) Field of Classification Search
CPC ...................................................... G06Q 10/20
See application file for complete search history.

(56) References Cited

U.S. PATENT DOCUMENTS

| | | | |
|---|---|---|---|
| 9,406,023 B2 | 8/2016 | Bogojeska et al. | |
| 10,535,002 B2 | 1/2020 | Gupta et al. | |
| 10,877,946 B1 | 12/2020 | Silva et al. | |
| 10,985,994 B1 | 4/2021 | Mahadik et al. | |
| 11,003,518 B2* | 5/2021 | Lopez | G06F 11/008 |
| 11,048,530 B1* | 6/2021 | Chatzipanagiotis | G06N 3/044 |
| 11,327,826 B1* | 5/2022 | Shama | G06N 20/00 |
| 2007/0067773 A1 | 3/2007 | Hope et al. | |
| 2008/0098109 A1 | 4/2008 | Faihe et al. | |
| 2018/0307756 A1 | 10/2018 | Garay | |
| 2020/0293946 A1 | 9/2020 | Sachan et al. | |
| 2021/0366268 A1 | 11/2021 | Jain et al. | |

(Continued)

OTHER PUBLICATIONS

Quispe Guanoluisa, D. A. (2020). Design and implementation of a micro-world simulation platform for condition-based maintenance using machine learning algorithms (Order No. 27736330). (Year: 2020).*

(Continued)

*Primary Examiner* — Maria C Santos-Diaz
(74) *Attorney, Agent, or Firm* — HUNTON ANDREWS KURTH LLP

(57) ABSTRACT

An automated system is provided for facilitating improvements to an incident resolution system. The system includes a scenario construction processor configured for establishing a system incident scenario and a machine learning model constructed using incident response information for each of a plurality of incidents. A simulation processor is configured to use the machine learning model to run simulations of the system incident scenario. Each simulation includes at least one variation of a selected critical action characteristic critical actions included in the scenario and each simulation produces a simulated incident resolution parameter. An improvement evaluation processor determines from the simulations, one or more of the at least one variation that results in a simulated incident resolution parameter meeting predetermined improvement criteria.

20 Claims, 8 Drawing Sheets

(56) References Cited

U.S. PATENT DOCUMENTS

2022/0207295 A1\* 6/2022 Stanevich ........... G06F 18/2185
2022/0292999 A1\* 9/2022 Kratzer ................. G06N 20/00

OTHER PUBLICATIONS

Amershi, S. (2012). Designing for effective end-user interaction with machine learning (Order No. 3542114). Available from ProQuest Dissertations and Theses Professional. (1143521974). (Year: 2012).\*

Crego, J. P. (1996). Critical incident management: Engendering experience through simulation (Order No. 28471240). Available from ProQuest Dissertations and Theses Professional. (2570358622). (Year: 1996).\*

Notification of Transmittal of the International Search Report and the Written Opinion of the International Searching Authority issued in PCT/US2023/012989, mailed Jul. 27, 2023, 12 pages.

Notification Concerning Transmittal of International Preliminary Report on Patentability from related PCT Application No. PCT/US2023/012989, mailed Aug. 20, 2024, 7 pages.

\* cited by examiner

SYSTEMS AND METHODS FOR OPTIMIZING INCIDENT RESOLUTION

RELATED APPLICATIONS

The subject matter of this application is related to that of U.S. Application Nos. 17/670,829, 17/670,855, 17/670,904, and 17/670,919, which are filed respectively, and the complete disclosures of all of which are incorporated herein by reference.

FIELD OF THE INVENTION

This disclosure relates generally to automated system incident resolution and, more particularly, to systems and methods for using historical incident data to estimate the effects of on-going and anticipated actions on the expected time required to resolve an incident.

BACKGROUND OF THE INVENTION

When an incident occurs in a highly complex enterprise environment technology system, the urgency to resolve the problem may result in many technological and human resources being brought to bear, some of which are duplicative or inappropriate for the problem. Even when the proper resources are involved, there is often difficulty in identifying critical information and assuring that it is distributed where it is needed. Monitoring and managing the efforts of disparate operatives and operations during an incident is extremely difficult and efficiency is often sacrificed for the sake of obtaining a speedy resolution. Key to the success of such management efforts are the ready availability of and regular updates to information about actions taken in furtherance of resolution and the ability to anticipate the likely impact of such actions.

Another key to success is the ability to assess the likely effect of changes to elements of the incident resolution process and to balance that effect with the likely difficulties and costs. Such changes could include, for example, changes in the type, number, and quality of the technological and human resources applied to the problem.

SUMMARY OF THE INVENTION

An illustrative aspect of the invention provides an automated system for facilitating resolution of an incident. The system comprises a data storage unit and an incident resolution improvement data processor. The data storage unit has stored therein incident response information for each of a plurality of system incidents. The incident response information for each incident includes incident characteristics, system status information, characterization and timing of critical actions taken to resolve the incident, and description and timing of resolution of each such critical action and overall resolution of the incident. The incident resolution improvement data processor is configured to retrieve incident response information from the data storage unit and use the incident response information to construct a machine learning model configured for use in simulating system incident response. The incident resolution improvement data processor is further configured to establish a system incident scenario including a set of scenario incident characteristics, scenario system status, and a set of scenario critical action records. Each scenario critical action record includes information on a scenario critical action including action characteristics, timing and resolution. The incident resolution improvement data processor is further configured to use the machine learning model to run one or more simulations of the system incident scenario using the scenario incident characteristics and the critical action characteristics. Each of the one or more simulations includes at least one variation of a selected critical action characteristic from the scenario incident characteristics or the critical action characteristics and each of the one or more simulations produces a simulated incident resolution parameter result. The incident resolution improvement data processor is also configured to determine, from the one or more simulations, one or more of the at least one variation that results in the simulated incident resolution parameter result meeting predetermined improvement criteria.

Another aspect of the invention provides an automated method of facilitating incident resolution. The method comprises obtaining, by an incident resolution improvement processor, incident response information for each of a plurality of system incidents. The incident response information for each incident includes incident characteristics, system status information, characterization and timing of critical actions taken to resolve the incident, and description and timing of resolution of each such critical action and overall resolution of the incident. the method further comprises building, by the incident resolution improvement processor, a machine learning model using the incident response information. The machine learning model is configured for simulating incident response. The method still further comprises establishing, by the incident resolution improvement processor, a system incident scenario including a set of scenario incident characteristics, scenario system status, and a set of scenario critical action records, each record including information on a scenario critical action including action characteristics, timing and resolution. The machine learning model is used by the incident resolution improvement processor to run one or more simulations of the system incident scenario using the scenario incident characteristics, scenario system status, and information from the scenario critical action records. Each of the one or more simulations includes at least one variation of a selected critical action characteristic from the scenario critical actions in the scenario critical action records and each of the one or more simulations produces a simulated incident resolution parameter. The method also comprises determining, by the incident resolution improvement processor from the one or more simulations, one or more of the at least one variation that results in the simulated incident resolution parameter meeting predetermined improvement criteria.

Another aspect of the invention provides an automated data processing system for facilitating improvements to an incident resolution system. The automated data processing system comprises a scenario construction processor configured for establishing a system incident scenario including a set of scenario incident characteristics, scenario system status, and a set of scenario critical action records. Each record includes information on a scenario critical action including action characteristics, timing and resolution. The automated data processing system further comprises a machine learning model constructed using incident response information for each of a plurality of incidents. The machine learning model being configured for use in simulating system incident response. The automated data processing system also comprises a simulation processor configured to use the machine learning model to run one or more simulations of the system incident scenario using the scenario incident characteristics, scenario system status, and information from the scenario critical action records. Each of the one or more simulations includes at least one variation of a selected critical action characteristic from the scenario critical actions in the scenario critical action records and each of the one or more simulations producing a simulated incident resolution parameter. The automated data processing system also comprises an improvement evaluation processor configured to determine, from the one or more simulations, one or more of the at least one variation that results in the simulated incident resolution parameter meeting predetermined improvement criteria.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

While the invention will be described in connection with particular embodiments and manufacturing environments, it will be understood that the invention is not limited to these embodiments and environments. On the contrary, it is contemplated that various alternatives, modifications and equivalents are included within the spirit and scope of the invention as described.

In enterprise scale technology systems dealing with vast numbers of data streams, there may be thousands of opportunities for service disruptions every hour. Large investments are made in monitoring systems to assure early detection and automated response for mitigation of problems. Regardless of such efforts, the complexity of such systems guarantees that there will be incidents that cannot be resolved solely by automated systems and the causes of which are not immediately apparent. Such incidents may trigger a response procedure that involves immediate gathering of personnel resources to evaluate and propose solutions to the problem. In many cases, this may involve the establishment of a bridge call or videoconference to which responders may be called to join. Bridge discussions may be recorded to allow for post-incident evaluation of resolution procedure. The resolution effort and the bridge call are typically run by one or more incident managers who are charged with assuring the right personnel are involved and with action assignment and evaluation.

Incident managers are highly dependent on the information and recommendations provided by personnel on the call. Because there may literally be hundreds of team members on the call, however, it may be extremely difficult to assure that the best action proposals are being heard. There may be too much or too little information and there may be conflicting information and proposals from different organizations. The result may be a tendency to throw many potential solutions at the problem simultaneously, with many different team members taking actions independently and without cross-pollination of information.

Embodiments of the present invention provide an incident resolution system that helps incident managers make decisions on critical actions to be taken in furtherance of resolution. This is accomplished by leveraging historical information on previous incidents through the use of machine learning. The system also helps managers control information and make more efficient use of human and technology resources.

Figure 1:
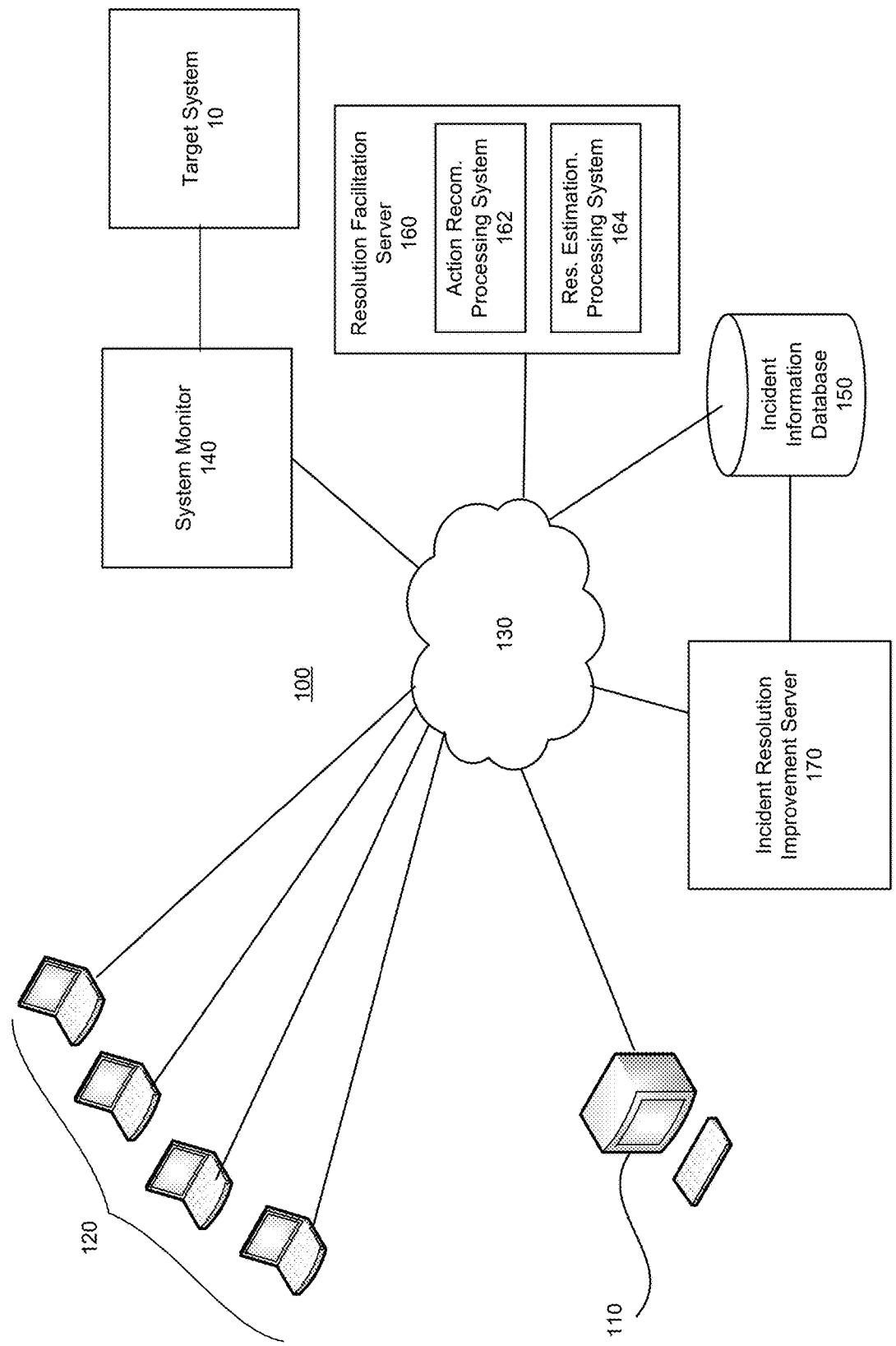
FIG. 1 is a schematic representation of an incident resolution system according to an embodiment of the invention.

With reference to FIG. 1, an incident resolution system 100 according to an example embodiment may include an incident manager data processing system 110 and one or more incident team member data processing systems 120 in communication with one another via a network 130. As will be discussed, the incident manager data processor 110 may be configured for receiving information from and providing information to an incident manager. The team member data processing systems may each be configured for receiving information from and providing information to an individual incident resolution team member. All of these systems may be connected to one another via the network 130 through the use of collaboration software. Any or all of the incident manager system 110 and the team member systems 120 may also be configured to initiate and/or monitor the results of actions in furtherance of resolving a system incident.

The resolution system 100 may also include or may be in communication with a system monitor 140 configured for monitoring and providing information on operations of a target system or object 10. The system monitor 140 is, in particular, configured to determine whether the target system or object 10 has experienced or is experiencing a service failure or other incident. As used herein, a system incident may be any instance where the monitored system 10 is in a measurably undesirable state (e.g., a system or component has crashed or suffered a hardware failure, an application has a memory leak or a performance issue, etc.). The system monitor 140 may be further configured to obtain diagnostic and other operating information for the monitored system 10 and communicate to appropriate recipient systems via the network 130.

It will be understood that the resolution system 100 may be connected to any number of systems 10 for purposes of monitoring performance thereof and resolving incidents therein. This may be accomplished using a plurality of system monitors 140 or using a single monitoring system 140 in communication with multiple systems 10.

The resolution system 100 includes a resolution facilitation server ("RFS") 160 that is configured for receiving information from any or all of the incident management system 110, the team member systems 120 and the system monitor 140 via the network 130. The RFS 160 may include or be in communication with an incident information database 150 that has stored therein historical information on previous system incidents and the actions taken in furtherance of resolution of such incidents. The RFS 160 may include an action recommendation processing system 162 configured to use the historical information from the database 150 to establish a machine learning-based action recommendation model capable of determining resolution action recommendations and providing such recommendations to the incident manager system 110. The action recommendation processing system 162 may further be configured to use subsequent actions and action results to update and refine the action recommendation model. The RFS 160 may, in addition to or instead of the action recommendation processing system 162, include a resolution estimation processing system 164 configured to use historical information from the database 150 to establish a machine learning model capable of estimating the time required to complete individual actions and observe the results of such actions. The resolution estimation processing system 164 may further be configured to estimate an expected overall time to resolve the incident.

The resolution system 100 may further include an incident resolution improvement server (IRIS) 170. As will be discussed in more detail hereafter, the IRIS 170 may be configured for using historical information from the incident resolution database 150 to establish a machine learning-based resolution improvement model, which can be used to determine the effects of changes to various aspects of actions taken in furtherance of incident resolution. The IRIS 170 may be further configured for using the resolution improvement model to optimize the procedures and resources used to effect specific actions or for overall incident resolution.

Figure 2:
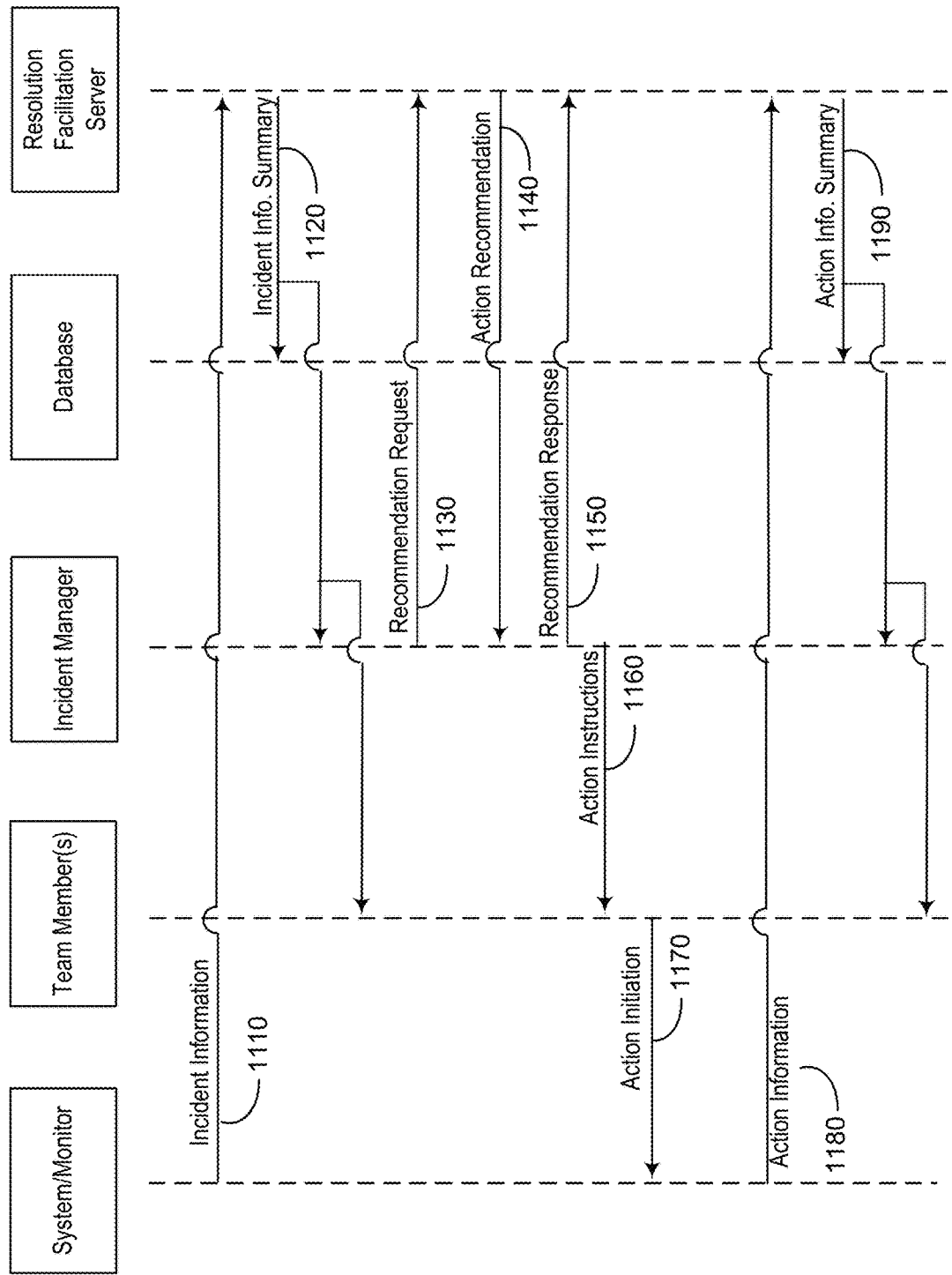
FIG. 2 is a sequence diagram illustrating a sequence of actions in facilitating incident resolution according to an embodiment of the invention.

The sequence diagram of FIG. 2 illustrates a typical operation scenario for the system 100 in which an action recommendation from the action recommendation processing system 162 of the RFS 160 is implemented. In the illustrated scenario, the system monitor 140 provides, at 1110, target system incident information to the RFS 160. The incident information may include information regarding various operating parameters for the system 10 and/or specific parameters associated with the identified failure or performance loss. The information may include current operating parameters and/or past parameters and associated times at intervals surrounding the start of the incident. The RFS 160 may assemble the incident information into a usable form and, at 1120, send it to the incident manager and, in some embodiments, one or more team members. The RFS 160 may also establish an incident record in the database 150 that includes some or all of the incident information. It will be understood that actions 1110 and 1120 may be repeated on a continuous, periodic, or as-needed basis throughout the incident resolution process to assure that all involved personnel have access to current incident status.

At 1130, the incident manager may send an action recommendation request to the action recommendation processing system 162 of the RFS 160. The action recommendation processing system 162 may then initiate one or more simulations using the machine learning model to identify one or more actions that may be taken in furtherance of resolving the incident. In some embodiments, the action recommendation processing system 162 may calculate a relative confidence level or otherwise score the potential value and/or likelihood of success of potential actions. These measures can be used to rank potential actions and make determinations as to whether they meet criteria for including in a recommendation. At 1140, the RFS 160 may send an action recommendation with one or more recommended actions to the incident manager. In some embodiments, the action recommendation may include a confidence level and/or other score for each recommended action. At 1150, the incident manager may return a recommendation response to the RFS 160. The recommendation response may, in some embodiments, be a simple binary response for each recommended action indicating that (1) the action will be taken (recommendation acknowledged/accepted) or (2) the recommended action will not be taken (recommendation declined/ignored). Regardless of whether the recommendation response is positive or negative, the action recommendation processing system 162 may use it to score the recommendation and to update the machine learning model, thus improving the likelihood of a positive recommendation result in the future. In some embodiments, when a positive recommendation response is received, the RFS 160 may initiate a tracking of the recommended action in anticipation of a result, which would then be used to further refine the machine learning model.

In cases where the action recommendation is accepted, the incident manager may, at 1160, issue an instruction to initiate an action in furtherance of incident resolution. It will be understood that actions in furtherance of resolution may have widely different degrees of importance and that some may be deemed critical actions that may be identified, tracked and controlled. Critical actions may be commonplace actions such as those necessary to establish the bridge call or to assure that necessary personnel are contacted. Critical actions may also include more significant actions taken to "fix the problem" (e.g., initiation of a reboot of a particular system component). Certain action types may be predetermined to be critical actions while others may be identified as critical actions by the incident manager. In some embodiments, critical actions may be identified based on analysis of prior incident history.

While the diagram in FIG. 2 shows the action instruction as being sent to one or more team members for execution or initiation, there may be instances where the action instruction is directed to other personnel or system components for direct action. For example, an action instruction may be sent by the incident manager directly to the resolution facilitation server. Such an action could be, for example, to request information or a predicted result for a proposed action. In some cases, the action may simply be to record the occurrence of a particular event (e.g., a critical event) and/or to identify and track a critical action.

At 1170, the requested action may be initiated and, at 1180, the system monitor may return recommended action result information to the RFS 160. In some instances, this may be or include an update to the status and/or operating parameters of the target system. The RFS 160 may assemble and analyze the received information and, at 1160, may send some or all of the information (or a summary) to the incident manager and, in some embodiments, to one or more of the team members. The RFS 160 may also evaluate the action result and store information in the incident information database regarding the nature of the action taken and the result. In some embodiments, the action recommendation processing system 162 of the RFS 160 may update the machine learning model based on the additional action/result information.

In the above-described scenario, an action recommendation is made by the RFS 160 in response to a request by the incident manager. In some embodiments, the RFS 160 may be configured to construct and send an action recommendation without receiving an explicit request. This could be triggered by the occurrence of other events and/or as the result of certain predetermined triggering criteria being met.

In some embodiments, the RFS 160 may be configured to continuously or at regular intervals evaluate potential actions without receiving a recommendation request. In such embodiments, the recommendation triggering criteria could be or include having a potential action achieve a target score relating to confidence level and/or likelihood of success at resolving some or all of the system problems associated with the incident. If a potential action identified by model simulation(s) meets the triggering criteria, the RFS 160 may construct a recommendation and send it to the incident manager.

Figure 3:
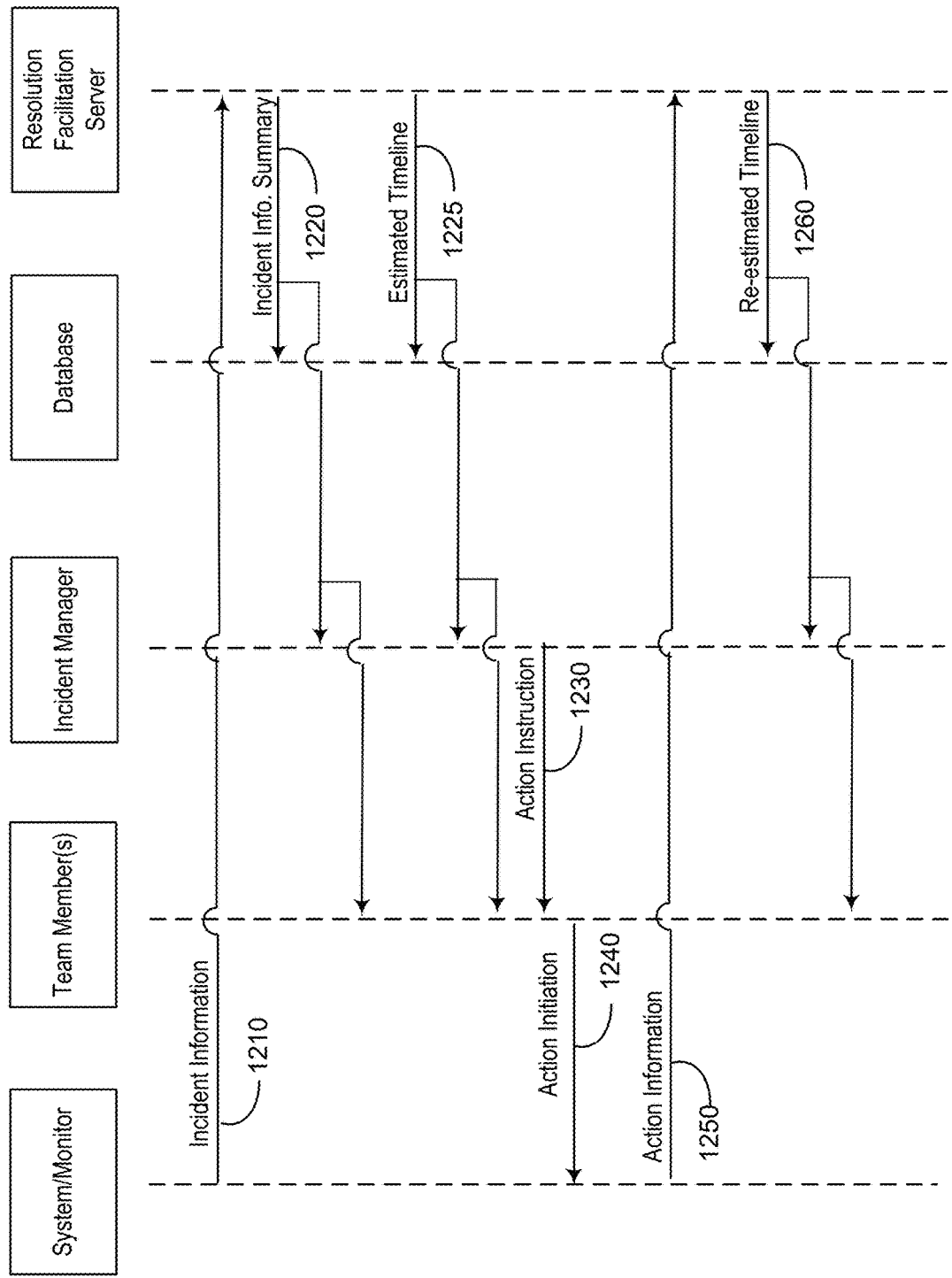
FIG. 3 is a sequence diagram illustrating a sequence of actions in facilitating incident resolution according to an embodiment of the invention.

The sequence diagram of FIG. 3 illustrates a typical operation scenario for distributing resolution estimation information and implementing an action on the incident resolution system 100. In the illustrated scenario, a failure or unacceptable performance loss in the target system 10 has been identified by the system monitor 140. At 1110, incident information obtained by the system monitor 140 from the target system 10 is sent to the RFS 160. The incident information may include information regarding various operating parameters for the system 10 and/or specific parameters associated with the identified failure or performance loss. The information may include current operating parameters and/or past parameters and associated times at intervals surrounding the start of the incident. The RFS 160 may assemble the incident information into a usable form and, at 1120, send it to the incident manager and, in some embodiments, one or more team members. The RFS 160 may also establish an incident record in the database 150 that includes some or all of the incident information. The resolution estimation processing system 164 of the RFS 160 may use the incident information to establish an initial timeline for the incident. In typical embodiments, the resolution estimation processing system 164 may establish an incident initiation time that may be used as a baseline time for use in determining the elapsed time of the resolution effort and for establishing the relative timing of data/information acquisition and actions taken in furtherance of resolution. According to various embodiments of the invention, the resolution estimation processing system 164 may also determine, based on historical information, a set of expected actions to be taken to resolve the incident. This may be accomplished, at least in part, using a machine learning model constructed based on information for previous incidents stored in the database 150. The resolution estimation processing system 164 may also estimate the sequence and timing of each action and, again based on historical data for such actions, estimate the cumulative time involved in taking the actions. This information may then be used to construct an estimated timeline that includes known timing information up to the current time and estimated events and timing information extending from the current time up to an estimated time for resolution of the incident. Using the estimated timeline information, the resolution estimation processing system 164 may construct a graphical representation of the timing of key events (known and estimated) from incident initiation to the estimated incident resolution. The estimated timeline information (in textual form, graphic form, or both) may be sent to the incident manager and team members at 1125.

At 1130, the incident manager issues an instruction to one or more team members to initiate an action in furtherance of incident resolution. While the diagram in FIG. 3 shows the action instruction as being sent to one or more team members for execution or initiation, there may be instances where the action instruction is directed to other personnel or system components for direct action.

At 1140, the one or more team members may initiate the requested action, e.g., by implementing a command to the target system or to the system monitor. At 1150, the system monitor may return action information to the resolution facilitation server. In some instances, this may be or include an update to the status and/or operating parameters of the target system. In general, the action information will include a time stamp associated with the initiation of the action. The RFS 160 may assemble and analyze the received information and send some or all of the information (or a summary) to the incident manager and, in some embodiments, to one or more of the team members. The resolution estimation processing system 164 of the RFS 160 may use the results of the action and current system status information to determine an updated set of expected actions to be taken to resolve the incident, estimate the sequence and timing of these actions, and reconstruct the estimated timeline for resolution of the incident. The re-estimated timeline may be then sent to the incident manager and team members at 1160.

It will be understood that the actions 1130, 1140, 1150 and 1160 may be repeated throughout the incident resolution process to assure that the incident manager and other team members have access to an up-to-date resolution estimate.

The constituents of the incident resolution system 100 will now be discussed in more detail. The manager and team member processing systems 110, 120 may be or include any network-enabled processor computer system or device including, but not limited to, any server, network appliance, personal computer (PC), workstation, mobile processing device such as a smart phone, smart pad, handheld PC, or personal digital assistant (PDA), or card-mounted microprocessor capable of direct or indirect network communication. The network-enabled computer systems used to carry out the methods contemplated by the invention may execute one or more software applications to, for example, receive data as input from an entity accessing the network-enabled computer system, process received data, transmit data over a network, and receive data over a network. The network-enabled computer systems may also include one or more software applications to provide notifications to a user. It will be understood that the depiction in FIG. 1 is an example only, and the functions and processes described herein may be performed by any number of network-enabled computers. It will also be understood that where the illustrated system 100 may have only a single instance of certain components, multiple instances of these components may be used. The system 100 may also include other devices not depicted in FIG. 1.

The network 130 may be or include a wireless network, a wired network or any combination of wireless network and wired network, and may be configured to connect the incident manager data processing system 110 and the incident team member data processing systems 120 to each other and to the other system components. The network 130 may, for example, include one or more of a fiber optics network, a passive optical network, a cable network, an Internet network, a satellite network, a wireless LAN, a Global System for Mobile Communication (GSM), a Personal Communication Service (PCS), a Personal Area Network, Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g, Bluetooth, Near Field Communication (NFC), Radio Frequency Identification (RFID), Wi-Fi, and/or the like.

In addition, the network 130 may include, without limitation, telephone lines, fiber optics, IEEE Ethernet 902.3, a wide area network (WAN), a wireless personal area network, a local area network (LAN), or a global network such as the Internet. In addition, the network 130 may support an Internet network, a wireless communication network, a cellular network, or the like, or any combination thereof. The network 130 may further include one network, or any number of the exemplary types of networks mentioned above, operating as a stand-alone network or in cooperation with each other. The network 130 may utilize one or more protocols of one or more network elements to which they are communicatively coupled. The network 130 may translate to or from other protocols to one or more protocols of network devices. Although the network 130 is depicted as a single network, it should be appreciated that according to one or more examples, the network 130 may comprise a plurality of interconnected networks, such as, for example, the Internet, a service provider's network, a cable television network, corporate networks, such as credit card association networks, and home networks.

Figure 4:
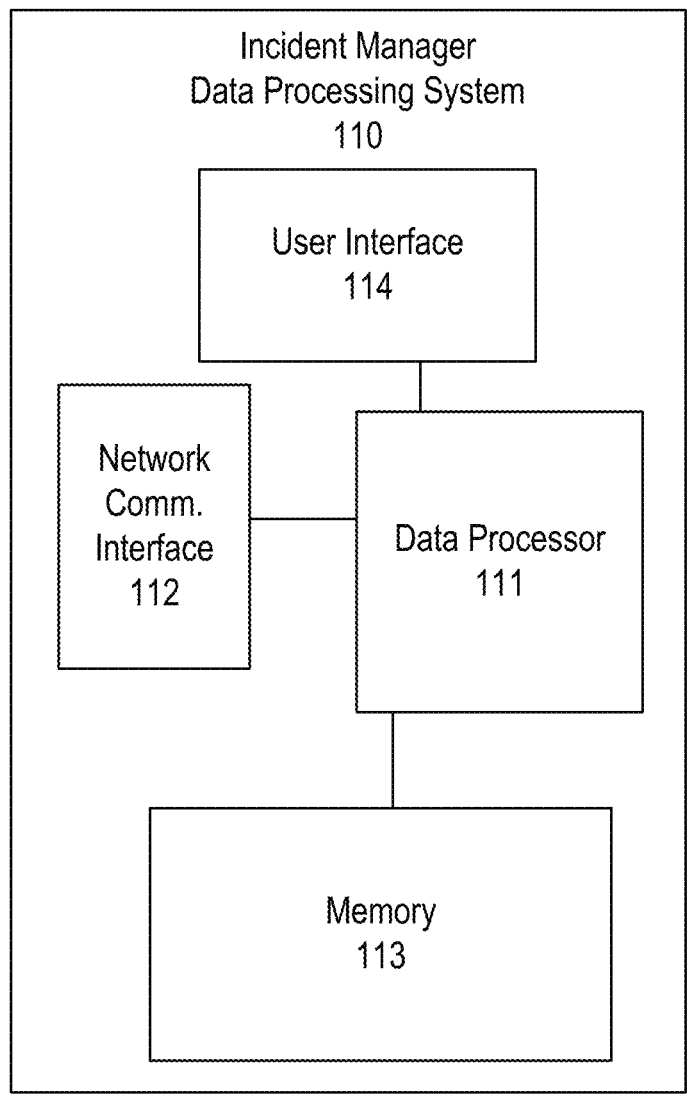
FIG. 4 is a schematic representation of an incident manager data processing system usable in implementing embodiments of the invention.

With reference to FIG. 4, the incident manager data processing system 110 may be or include any network-enabled data processing and/or communication device including, but not limited to a smartphone, a laptop, a desktop computer, and a tablet. In particular embodiments, the manager data processing system 110 includes an on-board data processor 111 in communication with a memory module 113, a user interface 114, and a communication interface 112. In some embodiments, the manager data processing system 110 may include an image capturing device (e.g., a digital camera) and/or an audio input/recording device. The data processor 111 can include a microprocessor and associated processing circuitry, and can contain additional components, including processors, memories, error and parity/CRC checkers, data encoders, anticollision algorithms, controllers, command decoders, security primitives and tamper-proofing hardware, as necessary to perform the functions described herein. The memory 113 can be a read-only memory, write-once read-multiple memory or read/write memory, e.g., RAM, ROM and EEPROM, and the device 110 can include one or more of these memories.

The user interface 114 may include one or more user input mechanisms, which can be any device for entering information and instructions into the manager data processing system 110, such as a touch-screen, keyboard, mouse, cursor-control device, microphone, stylus, or digital camera. The user interface 114 may also include a display, which can be any type of device for presenting visual information such as a computer monitor, a flat panel display, and a mobile device screen, including liquid crystal displays, light-emitting diode displays, plasma panels, and cathode ray tube displays. In some embodiments, the user interface 114 may be configured to capture audio-visual communications between a user of the system 110 and users of other network-connected data processing systems (e.g., team member data processing systems 120).

The communication interface 112 is configured to establish and support wired or wireless data communication capability for connecting the device 110 to the network 130, or other communication network. The communication interface 112 can also be configured to support communication with a short-range wireless communication interface, such as near field communication (NFC), radio-frequency identification, and Bluetooth.

In embodiments of the invention, the memory 113 may have stored therein one or more applications usable by the data processor 111 to conduct and/or monitor exchanges with the RFS 160 and team member data processing systems 120. In particular, the memory may have stored therein an incident resolution facilitation application configured for monitoring communications from the system monitor and the RFS 160 and for receiving and displaying incident resolution information from the RFS 160. The application may also be configured for transmitting action instructions, tracking action initiation and resolution, and receiving action result information. The application may further be configured for constructing an action recommendation request, transmitting such a request to the RFS 160 and receiving from the RFS 160 an action recommendation. The application may also be configured for presenting the action recommendation to the user (e.g., an incident manager), for receiving recommendation response information from the user, and for transmitting a recommendation response to the RFS 160.

In some embodiments, the resolution facilitation application may be configured to receive and interpret audio instructions from the user of the manager data processing system 110. In particular, the application may be configured to recognize a particular audio cue to indicate that an audio instruction will follow, receive and interpret the subsequent audio instruction, and then take action in accordance with the instruction. For example, during an application-monitored bridge call, the incident manager may determine that an action recommendation should be requested. The incident manager may then verbalize the audio cue and audibly request that an action request be sent to the RFS 160 without otherwise interrupting the call. The application would then construct and transmit the request to the RFS 160. Other examples could include instructions to note the occurrence of events, instructions to identify and track critical actions, or evaluate a hypothetical action.

The resolution facilitation application may be configured to receive from the RFS 160 and display, via the user interface 114, information relating to incident resolution. This may include updates to target system status, information on actions taken and (if applicable) the results of such actions, resource availability, etc. The application may, in particular, be configured to receive and display incident resolution timeline information. This may include a graphic presentation of the timing of actual resolution events, projected/estimated events, or both.

Like the incident manager data processing system 110, the team member data processing systems 120 may be or include any network-enabled data processing and/or communication device including, but not limited to a smartphone, a laptop, a desktop computer, and a tablet. The team member data processing systems 120 would also have a data processor, memory, a user interface and a communication interface. The memory of the team member data processing systems 120 may also have an incident resolution facilitation application stored therein, but with lesser functionality than is provided to the manager system 110. The team member system application may, for example, be configured for receiving and displaying information received from the RFS 160 and for tracking communications and actions involving a particular team member system 120.

The system monitor 140 may be any combination of a network-enabled processor and software configured to monitor the target system 10 or a particular software application operating thereon to determine operating status and identify and track the occurrence of an incident thereon or associated therewith. The system monitor 140 may track operating parameters and at regular intervals and/or upon command provide incident information to the RFS 160 and/or other system components/actors.

The incident information database 150 is or includes one or more data storage units having stored therein searchable historical data records for enterprise system incident and incident resolution efforts. These data records may include information for incidents occurring on the target system 10 and/or other incident-stricken systems. For each incident, the recorded information may include, without limitation, time-based information on the nature and characteristics of the incident, the state of the stricken system, resources available and resources used to resolve the incident, critical actions taken in furtherance of incident resolution and information on the results of each such action, and external conditions affecting incident causes or resolution. In particular embodiments, critical actions may be categorized according to action type, resources required, relative effectiveness, etc. In some embodiments, common critical actions may be pre-defined or fall into pre-defined categories. Stored incident information may also include audio and/or video recordings of communications between resolution team members.

The incident information database 150 includes records for all critical actions taken in previous incident resolution events. The stored information for each action includes the characteristics of the action including the specific technological and human resources used to implement the action. Action characteristics may also include the specific steps taken and the timing of each.

The RFS 160 may include one or more network-enabled data processing systems configured for communication with each other and with other components of the incident resolution system 100 via the network 130 or other networks. As noted above, the RFS 160 may include one or both of an action recommendation processing system 162 and a resolution estimation processing system 164.

The action recommendation processing system 162 may be or include one or more network-enabled automated data processors configured for communication with each other and with other components of the incident resolution system 100 via the network 130 or other networks. The action recommendation processing system 162 may be configured to receive incident information from any one or more of the system monitor 140, incident manager data processing system 110, and the team member data processing systems 120. The action recommendation processing system 162 may, in particular, be configured to receive incident and system operating parameter information for the target system 10 from the system monitor 140, assemble and analyze this information and compare it to information on previous incidents.

The action recommendation processing system 162 may be configured for receiving and storing time-based incident information for the incident in the incident information database 150. This may include some or all of the information received from the system monitor 140 and information received from any system component regarding critical events or actions. In some embodiments, the action recommendation processing system 162 may be configured to receive information from other sources that could affect team activities or system performance. For example, the system 162 may access information on personnel and system resource availability. Any or all such information may be stored in the incident information database 150 so that its impact may be incorporated into models for identifying resolution actions in the future.

The action recommendation processing system 162 may be further configured for receiving action information regarding critical actions taken in furtherance of incident resolution from the manager data processing system 110 or any of the team member data processing systems 120. The action information may include an action type, a time stamp, and a description including the specific resources used. If the action information relates to a newly identified or initiated action, the incident processing manager may assign an action-unique identifier to assist in tracking and evaluating the resolution of the action. Action information for a previously identified or initiated action may include the previously assigned action-unique identifier. Such information may also include a status of the action and other information relating to the effect of the action. In some instances, the action information may include an indication of a final resolution of the action including timing associated therewith. In some embodiments, the action recommendation processing system 162 may be configured to store action information for critical actions in the incident information database 150.

The action recommendation processing system 162 may be configured to determine a need for or respond to a request for a recommendation for an action to be taken in furtherance of resolving a system incident. Upon establishing that an action recommendation should be determined, the action recommendation processing system 162 may initiate the process of generating a recommendation. In various embodiments of the invention, action recommendations are established based on a combination of available resolution resources, current system status, and historical information for previous incident resolution efforts. As previously discussed, the incident information database 150 comprises historical records regarding prior system incidents and their resolution. This information may be fed to a machine learning-based incident resolution model on a continuous or periodic basis or, in some embodiments, upon request or upon submission of new information to the database 150. The incident information from the incident database 150 may be used to train the machine learning model to identify and establish the likely relative value of predefined actions that may be taken to resolve a current incident. The model may also take into account instances of previous action recommendations made during both current and prior incident resolution efforts. In particular, the model may account for the response of the incident manager to such previous recommendations (e.g., establishing a positive association with accepted recommendations and a negative association with declined recommendations).

The action recommendation processing system 162 may use the machine learning model to obtain one or more candidate actions, rank the candidate actions and/or determine whether the candidate actions meet predetermined threshold values for recommendation. The action recommendation processing system 162 may then transmit the recommendation to the incident manager data processing system 110. The action recommendation processing system 162 may be also be configured for receiving information about a response recommendation and, if applicable, the results of the recommended action. This information may be used to establish feedback for further teaching of the machine learning model.

The resolution estimation processing system 164 may be or include one or more network-enabled automated data processors configured for communication with each other and with other components of the incident resolution system 100 via the network 130 or other networks. The resolution estimation processing system 164 may be configured to receive incident information from any one or more of the system monitor 140, incident manager data processing system 110, and the team member data processing systems 120. The resolution estimation processing system 164 may, in particular, be configured to receive incident and system operating parameter information for the target system 10 from the system monitor 140, assemble and analyze this information and compare it to information on previous incidents.

The resolution estimation processing system 164 may be configured for receiving and storing time-based incident information for incidents documented in the incident information database 150. This may include some or all of the information received from the system monitor 140 and information received from any system component regarding critical events or actions. Such information may include, for example, the actions taken to identify and contact personnel for the incident resolution team and tracking of participation and actions by the identified personnel. In some embodiments, the resolution estimation processing system 164 may be configured to receive information from other sources that could affect team activities or system performance. For example, the processor 162 may access information on personnel and system resource availability. Any or all such information may be stored in the incident information database 150 so that its impact may be incorporated into models for identifying resolution actions in the future.

The resolution estimation processing system 164 may, in particular, be configured for receiving action information regarding critical actions taken in furtherance of incident resolution from the manager data processing system 110 or any of the team member data processing systems 120. The action information may include an action type, a time stamp, and a description including the specific resources used. If the action information relates to a newly identified or initiated action, the incident processing manager may assign an action-unique identifier to assist in tracking and evaluating the resolution of the action. Action information for a previously identified or initiated action may include the previously assigned action-unique identifier. Such information may also include a status of the action and other information relating to the effect of the action. In some instances, the action information may include an indication of a final resolution of the action including timing associated therewith. In some embodiments, the action recommendation processing system 162 may be configured to store action information for critical actions in the incident information database 150.

The estimation processing system 164 may be configured to receive information about an initiated or proposed action and, using current incident information (including target system state information), determine an estimate of the time required for the action to be resolved (i.e., produce a tangible result). This may be accomplished by comparing the action to previous actions for which information is stored in the incident information database 150. The estimation processing system 164 may be provided with criteria for establishing action, incident, and target system similarity that may be used to establish comparable actions. Statistical analysis of such actions may then be used to provide an expected duration between action initiation and action resolution.

The estimation processing system 164 may also be configured to, periodically, continually, or upon demand, update timeline information for the incident resolution project. The timeline information may include actual time of occurrence information for events that have already occurred. It may also include estimated times of occurrence for expected future events, including expected action initiation and resolution events. Timeline information may also include an estimate of the incident end time (i.e., the expected time at which the incident is resolved). To accomplish this, the estimation processing system 164 may be configured to receive initiation timing and estimated duration information on all critical actions and hypothesis checks that have been initiated or scheduled. This information can be used to determine an estimated time of completion of all currently ongoing actions.

In order to obtain an overall estimate of the remaining time to resolution of the incident, the estimation processing system 164 may require information on expected additional actions that will be taken in order to achieve resolution. The estimation processing system 164 may be configured to use a machine learning-based incident resolution model to identify the expected additional events using the current incident information, the expected outcomes of the ongoing actions, available resolution resources and historical information on previous incident s from the incident information database 150. The model may also take into account instances of previous action predictions made during both current and prior incident resolution efforts. Feedback on the relative success of such predictions may be provided to refine the model.

The estimation processing system 164 may use the machine learning model to identify a likely sequence of actions that will be taken to obtain resolution of the incident. This may include identification of actions taken in parallel and actions that would be taken in a sequential order. Using the expected timing and duration of these actions, the system 164 may be configured to identify an expected timeline of events leading to a final incident resolution. The expected time to resolution may be determined by adding the durations of the expected actions (accounting for overlap of parallel actions). In some embodiments, the system 164 may compare this result to an overall statistical analysis of similar incident duration information to assess the reasonableness of the estimated time to resolution.

In some embodiments, the estimation processing system 164 may be configured for constructing a graphical representation of timeline information for display along with or as part of an incident dashboard configured to track communications and display other incident status information. The estimation processing system 164 may be configured to present timeline display options to a user (e.g., on the incident manager processor system 110 or a team member processing system 120) and receive a response including instructions indicating particular display criteria. Such instructions could include, for example, a request to display only completed actions and events (i.e., no currently ongoing or estimated actions). The instructions could also indicate a particular segment of time for which the timeline is to be presented.

Figure 5:
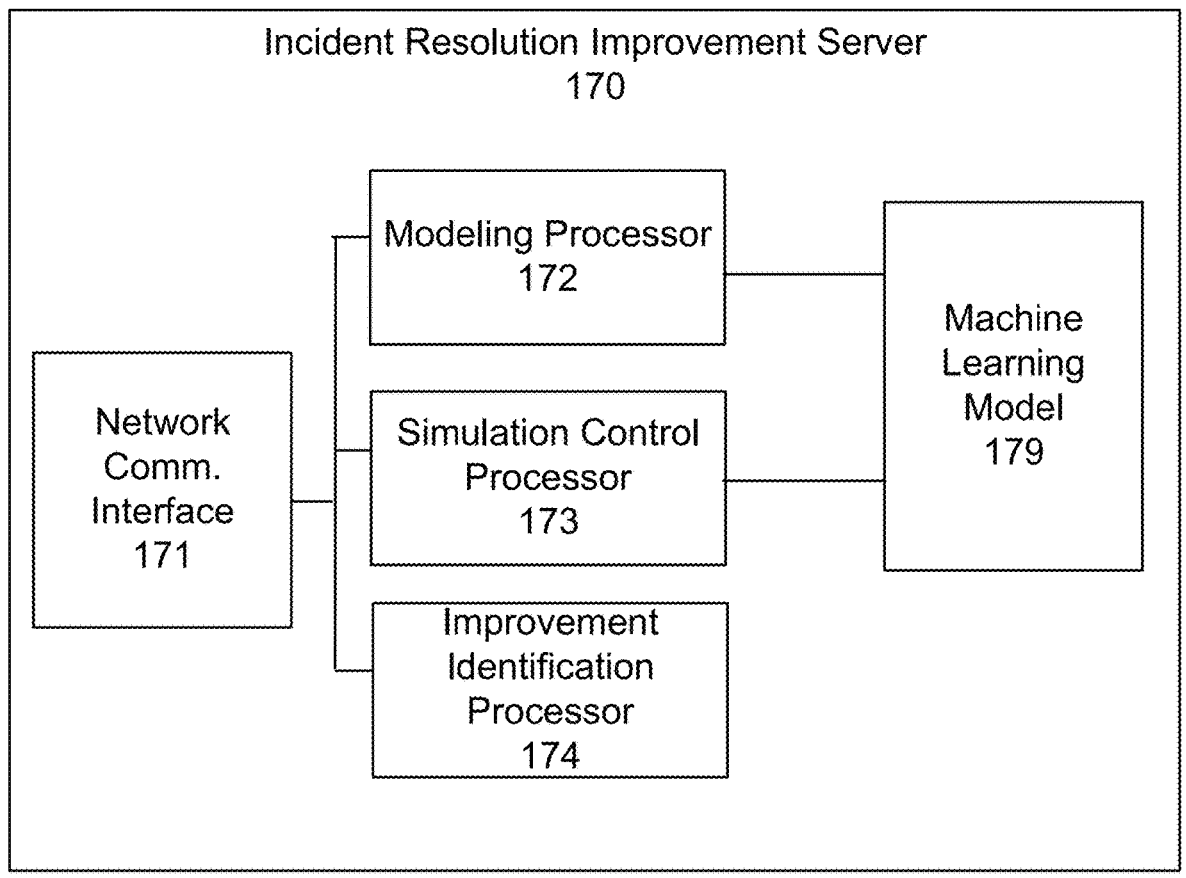
FIG. 5 is a schematic representation of an incident resolution improvement server according to an embodiment of the invention.

The IRIS 170 may be or include one or more network-enabled automated data processors configured for communication with each other and with other components of the incident resolution system 100 via the network 130 or other networks. With reference to FIG. 5, the IRIS 170 may, in particular, include a network communication interface 171 in communication with a modeling processor 172, a simulation control processor 173, and an improvement identification processor 174.

The modeling processor 172 may be or include one or more network-enabled automated data processors configured to retrieve incident response information for a plurality of incidents from the incident information database 150 and use it to assemble and train a machine learning model 179. The incident response information for each of a plurality of system incidents, the incident response information for each incident may include incident characteristics, time-variable system state information, characterization and timing of critical actions taken to resolve the incident, and description and timing of resolution of each such critical action and overall resolution of the incident. In some embodiments, the modeling processor 172 may also be configured to receive incident response information for new or on-going incidents from any one or more of the system monitor 140, incident manager data processing system 110, and the team member data processing systems 120.

The modeling processor 172 may be configured to feed the incident response information to a machine learning-based incident resolution model. The incident information from the incident database 150 may be used to train the machine learning model to identify and establish the action characteristics and system state variables, which when varied, produce the most significant changes in predetermined resolution parameters. Such resolution parameters may include, for example, duration of incident resolution (i.e., the time required to achieve resolution of the incident), incident resolution cost, and measurable effects on system availability to users (e.g., account holders or other customers). For example, the machine learning model may be trained to identify variations in certain action characteristics (e.g., amount or type of personnel or technological resources used) that have the most significant effect on the length of time it takes to resolve a particular incident type.

In exemplary embodiments, the machine learning model 179 may be an unsupervised learning model that makes use of any of various known algorithms. The exemplary model can utilize various neural networks, such as convolutional neural networks ("CNN") or recurrent neural networks ("RNN") to generate the machine learning model. In exemplary embodiments, a CNN can include one or more convolutional layers (e.g., often with a subsampling step), followed by one or more fully connected layers as in a standard multilayer neural network. CNNs can utilize local connections, and can have tied weights followed by some form of pooling which can result in translation invariant features.

RNNs are a class of artificial neural network where connections between nodes form a directed graph along a sequence. This facilitates the determination of temporal dynamic behavior for a time sequence. Unlike feedforward neural networks, RNNs can use their internal state (e.g., memory) to process sequences of inputs. RNNs may include two broad classes of networks with a similar general structure, where one is finite impulse and the other is infinite impulse. Both classes of networks exhibit temporal dynamic behavior. A finite impulse recurrent network can be, or can include, a directed acyclic graph that can be unrolled and replaced with a strictly feedforward neural network, while an infinite impulse recurrent network can be, or can include, a directed cyclic graph that may not be unrolled. Both finite impulse and infinite impulse recurrent networks can have additional stored state, and the storage can be under the direct control of the neural network. The storage can also be replaced by another network or graph, which can incorporate time delays or can have feedback loops. Such controlled states can be referred to as gated state or gated memory, and can be part of long short-term memory networks ("LSTMs") and gated recurrent units.

RNNs can be similar to a network of neuron-like nodes organized into successive "layers," each node in a given layer being connected with a directed e.g., (one-way) connection to every other node in the next successive layer. Each node (e.g., neuron) can have a time-varying real-valued activation. Each connection (e.g., synapse) can have a modifiable real-valued weight. Nodes can either be (i) input nodes (e.g., receiving data from outside the network), (ii) output nodes (e.g., yielding results), or (iii) hidden nodes (e.g., that can modify the data en route from input to output). RNNs can accept an input vector x and give an output vector y. However, the output vectors are based not only by the input just provided in, but also on the entire history of inputs that have been provided in in the past.

For supervised learning in discrete time settings, sequences of real-valued input vectors can arrive at the input nodes, one vector at a time. At any given time step, each non-input unit can compute its current activation (e.g., result) as a nonlinear function of the weighted sum of the activations of all units that connect to it. Supervisor-given target activations can be supplied for some output units at certain time steps. For example, if the input sequence is a speech signal corresponding to a spoken digit, the final target output at the end of the sequence can be a label classifying the digit. In reinforcement learning settings, no teacher provides target signals. Instead, a fitness function, or reward function, can be used to evaluate the RNNs performance, which can influence its input stream through output units connected to actuators that can affect the environment. Each sequence can produce an error as the sum of the deviations of all target signals from the corresponding activations computed by the network. For a training set of numerous sequences, the total error can be the sum of the errors of all individual sequences.

The machine learning model 179 may be configured for use in simulating the effect of particular variations in action characteristics or in system state variables. For example, the machine learning model 179 may be used to run simulations based on variations in the experience level or amount of training received by personnel carrying out aspects of a particular critical action. The results of such simulations may be used to determine the relative impact of such variations on the overall resolution parameter of interest.

The simulation control processor 173 may be may be or include one or more network-enabled automated data processors configured to establish a particular incident scenario and identify action characteristics and system state variables/characteristics for variation based on the incident scenario and the resolution parameter(s) of interest. The incident scenario may include identification of a particular system or systems and a set of incident characteristics. The incident scenario may be hypothetical or may replicate the characteristics of an actual system incident.

The simulation control processor may be further configured to run incident resolution simulations for the incident scenario using the machine learning model 179 and a range of variations in one or more of the identified characteristics. Each simulation includes at least one variation of a selected characteristic from the scenario incident characteristics or the critical action characteristics and each of the one or more simulations produces a simulated incident resolution parameter result (e.g., a total resolution time or cost).

The improvement identification processor 174 may be may be or include one or more network-enabled automated data processors in communication with the simulation control processor 173. The improvement identification processor 174 may be configured to receive or otherwise establish resolution parameter criteria for use in evaluating the results of incident resolution simulations run by the simulation control processor. In particular embodiments, the improvement identification processor 174 may assemble results from a plurality of incident simulations and identify characteristics and characteristic variations that produce desirable improvements in the incident resolution parameter of interest. The improvement identification processor 174 may be further configured to identify a set of action or system state characteristics and associated variations the produce resolution parameter results that meet resolution parameter screening criteria. Such criteria could include, for example, a requirement that the variation produce at least a certain change percentage in a particular resolution parameter. In a specific example, the criteria could require at least a minimum reduction in resolution time when compared to a baseline time interval or the resolution time for an actual incident. The improvement identification processor 174 may, in some embodiments, be configured to apply the resolution parameter criteria to identify a single combination of one or more characteristics with a particular variation for each. In some embodiments, the improvement identification processor 174 may be configured to use improvement criteria across multiple incident resolution parameters to identify an optimized set of system state and action characteristic changes.

The improvement identification processor 174 may be configured to construct a recommendation comprising a set of proposed changes in target system parameters and/or incident resolution procedures based on the identified variation(s) and to transmit the recommendation to an incident manager or other user. The recommendation may include an expected improvement in a particular resolution parameter for the given system and incident scenario if the changes are implemented. The proposed changes may be implemented by the incident manager in advance of or during the occurrence of a new incident resolution effort. Alternatively or in addition, the improvement identification processor 174 may transmit some or all of the simulation variation results to the RFS 160, which may use them to update the machine learning model used to determine resolution action recommendations.

In some embodiments, the improvement identification processor 174 may be configured to communicate with one or more components of the incident response system 100 via the network communication interface 171 and the network 130 and to identify, from such components, a particular component for carrying out the recommended action(s). The improvement identification processor 174 may then transmit to that component, an action implementation command comprising instructions to carry out the recommended action.

In some embodiments, the simulation control processor 173 and the improvement identification processor 174 may also be configured to run simulation updates based on changes that have been made to systems that have been involved in previous incidents. In these embodiments, one of the simulation control processor 173 and the improvement identification processor 174 may be configured to determine obtain current system state information for an application processing system associated with the one of the incidents documented in the incident information database 150. The simulation control processor 173 may then run a series of characteristic variation simulations using the incident scenario information from the database 150 but with the updated system state information rather than the system state information at the time of the incident. This allows improvement identification processor 174 to determine an expected effect of the system state change(s) on the resolution parameter. It also allows the determination of updated improvement recommendations for the revised system.

Figure 6:
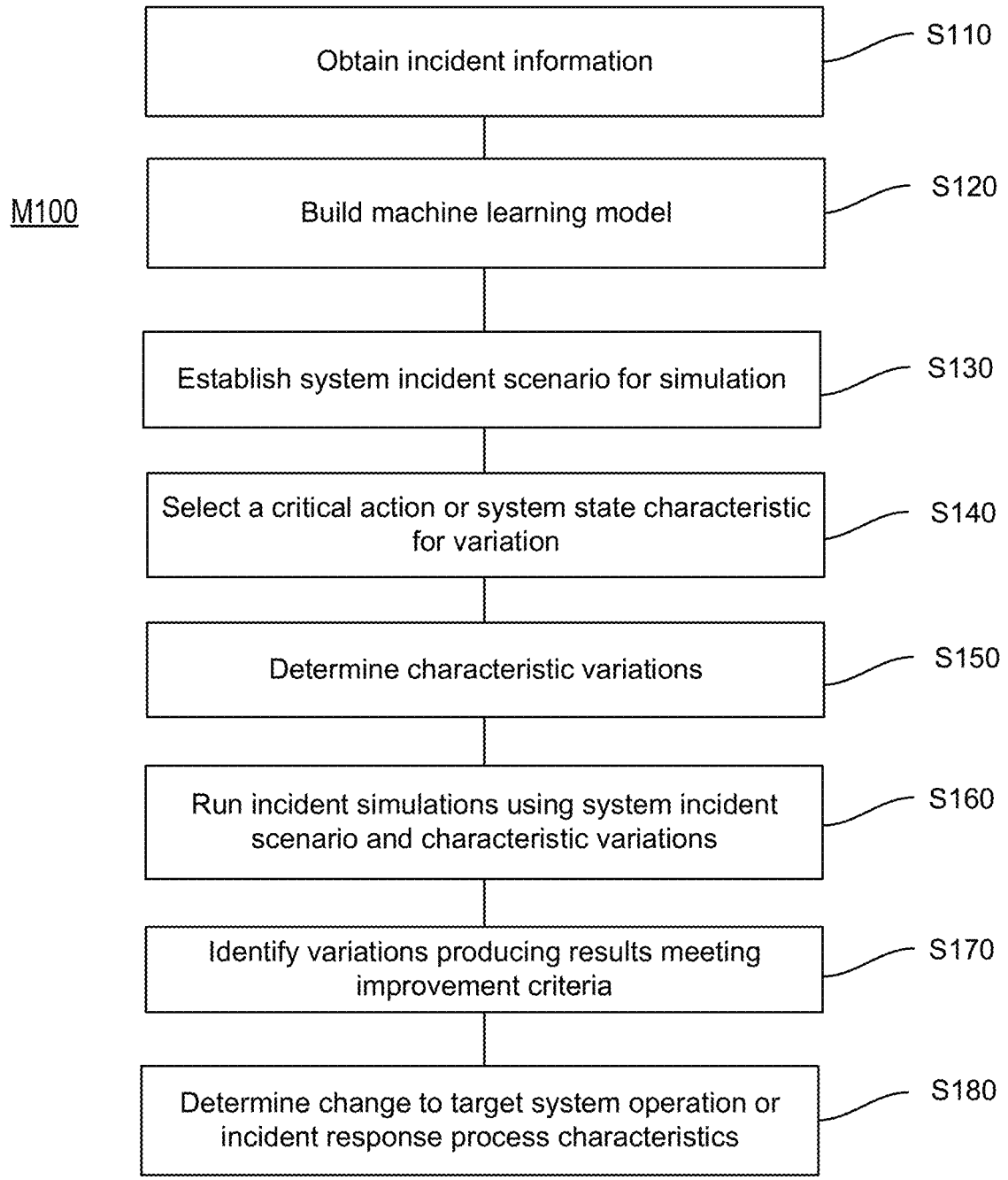
FIG. 6 is a flow chart of actions in a method of facilitating incident resolution according to an embodiment of the invention.

FIG. 6 illustrates an automated method M100 of facilitating resolution of incidents in or on target systems according to an illustrative embodiment of the invention. While the method M100 will be described in the context of system 100 of FIG. 1, it will be understood that the method M100 may be implemented on other incident resolution arrangements as well. At S110 of the method M100, an incident resolution improvement server obtains incident response information for a plurality of incidents. In typical embodiments, the IRIS will obtain some or all of this information from an incident information database. The incident response information for each incident may include incident characteristics, time-variable system state information, characterization and timing of critical actions taken to resolve the incident, and a description of the timing and nature of the resolution of each such critical action. The incident response information may also include the timing of the overall resolution of the incident. At S120, a modeling processor of the IRIS may use the incident response information to build a machine learning model configured for simulating the incident response process. The machine learning model may also be configured for identifying changes that can be made in the process to improve future incident response efforts. At S130, the IRIS establishes a system incident scenario for use in a series of incident resolution simulations. The incident scenario may be hypothetical or may replicate some or all of the characteristics of an actual system incident. The incident scenario may include identification of a particular system or systems, the initial state of the system or systems, and a set of incident characteristics describing the nature of the incident. In some embodiments, the incident scenario may also include information on expected or actual critical actions taken to resolve the incident. In other embodiments, an initial simulation may be run to determine, based on the historical incident response information, an expected timeline of actions taken to resolve the incident. The incident scenario may also include information on the ultimate resolution (actual or simulated) of the incident, including information on such resolution parameters as duration of the resolution effort, cost of the resolution effort (in monetary or resource expenditure terms or in terms of opportunity cost), customer/user impact, etc. In some embodiments, where the incident scenario is based on an actual incident, the IRIS may identify the target system involved and determine whether the characteristics of the target system have changed since the incident occurred. The IRIS may then replace the historic system characteristics with the current characteristics of the target system for use in the incident scenario to be simulated.

At S140, the IRIS selects one or more critical action and/or system state characteristics for variation in a subsequent series of simulations. To do this, the IRIS may examine the critical actions taken or expected and identify action characteristics and system state variables/characteristics that may be changed in order to alter one or more incident resolution parameters of interest. In some embodiments, candidate characteristics may be identified by the machine learning model. One or more of the change candidates may be selected for variation in a series of simulations, and, at S150, the IRIS may determine the specific variations to be applied for each variable characteristic. In one example scenario, the variable characteristic could be the number of persons assigned to a critical action task. In another example, the variable characteristic could be the computational or memory resources available to the target system, a system monitor or RFS.

At S160, the IRIS may use the machine learning model to run one or more simulations of the system incident scenario using the scenario incident characteristics. Each simulation is run with at least one variation of a selected critical action or system state characteristic and each simulation produces one or more simulated incident resolution parameters corresponding to resolution parameters of interest. At S170, the IRIS may review the simulation results and identify the characteristic variations that result in a desired change (e.g., an improvement) to a particular resolution parameter of interest. The relative desirability of a change result may be determined by comparison with predetermined criteria. Such criteria may be based solely on the degree of improvement. For example, the IRIS could determine that various increases in the resources applied resulted in changes to the time required to resolve the incident. The IRIS could also determine, however, that increases in personnel only produce resolution time improvements up to a certain point and further increases actually increase the resolution time. This allows identification of an optimum change level.

In some embodiments, criteria for change selection may be determined across multiple result parameters to identify an optimum characteristic change. For example, in addition to improving resolution time, increases in personnel are also likely to result in an increased resolution cost. The machine learning model and the criteria for determining characteristic changes may be configured to identify a characteristic change that produces an optimum combination of improvement and cost. This may require an iterative approach to simulation of the resolution scenario.

Figure 7:
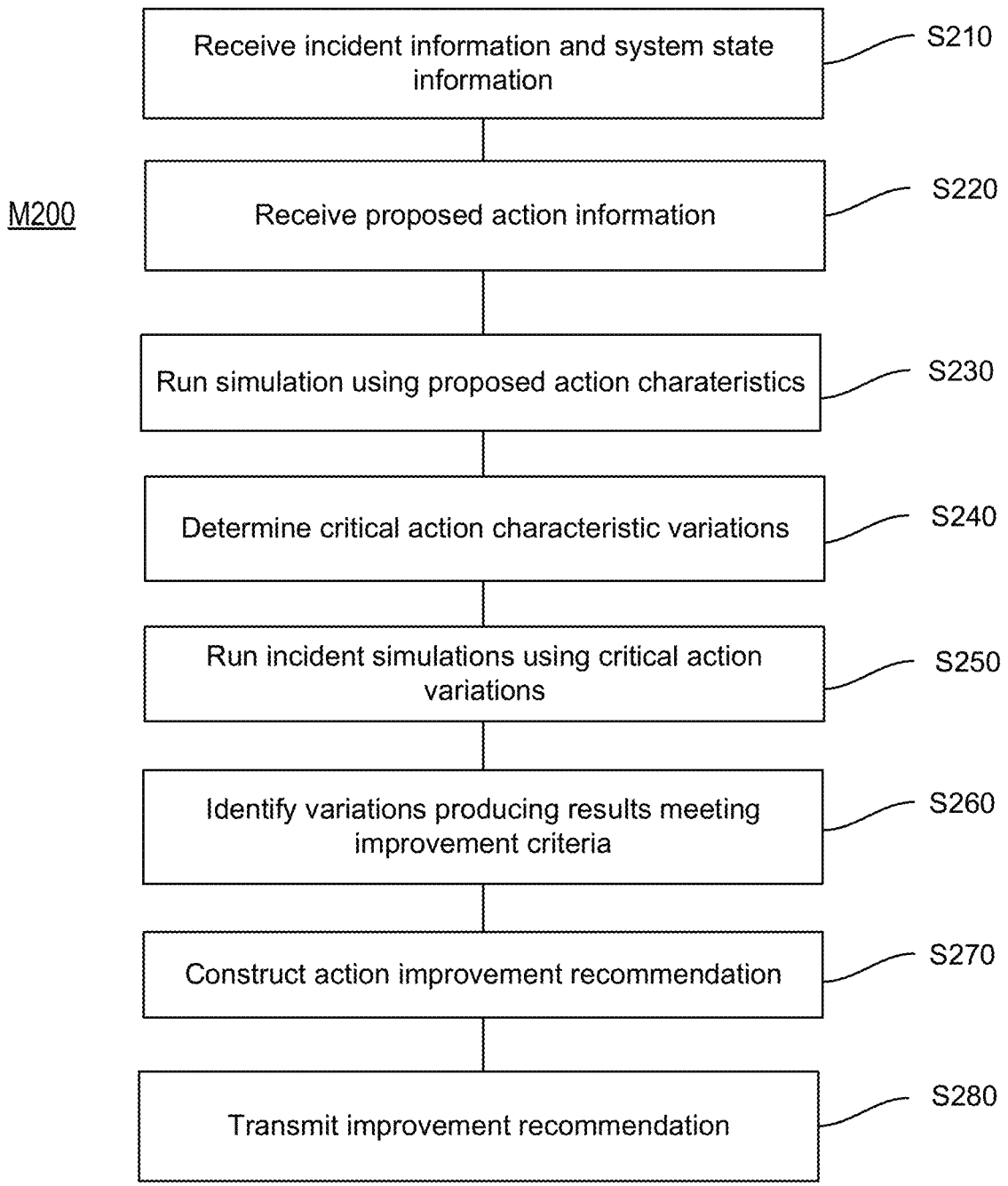
FIG. 7 is a flow chart of actions in a method of facilitating incident resolution according to an embodiment of the invention.

The method M100 may be used to determine improvements to the operation of the target system and/or improvements to future incident resolution efforts. FIG. 7 illustrates a method M200 for facilitating an on-going incident resolution effort. While the method M200 will be described in the context of system 100 of FIG. 1, it will be understood that the method M200 may be implemented on other incident resolution arrangements as well. At S210 of the method M200, an incident resolution improvement server receives incident information and system state information for a current, on-going incident resolution process. Such incident information may be received from any or all of an RFS, a target system monitor, an incident manager data processor, and one or more incident team member data processing systems involved in the resolution effort. The incident information can include status information on one or more operating parameters of the target system and information on critical actions that have been taken, both resolved and unresolved. At S220, the IRIS may receive an action evaluation request including information on a proposed action. This request will typically be received from an incident resolution manager, but could also be received from one of the incident resolution team members. In some embodiments, the request may be received from the RFS.

At S230, the IRIS uses the incident information and the system state information to run an incident resolution simulation of the effect of the proposed action. This simulation may be run using a machine learning model constructed based on historic data from a database of previous incident resolution information. This simulation provides a baseline of expected action resolution and incident resolution parameters (e.g., time and cost). At S240, the IRIS selects one or more characteristics of the proposed action for variation in a subsequent series of simulations. At S250, the IRIS may determine the specific variations to be applied for each variable characteristic and run simulations using the machine learning model and the action characteristic variations. Each simulation is run with at least one variation of a selected critical action characteristic and each simulation produces one or more simulated incident resolution parameters corresponding to resolution parameters of interest. At S260, the IRIS may review the simulation results and identify the characteristic variations that result in a desired change (e.g., an improvement) to a particular resolution parameter of interest. The relative desirability of a change result may be determined by comparison with predetermined criteria. Such criteria may be based solely on the degree of improvement of one parameter or may be based on multiple parameters to allow tradeoffs. At S270, the IRIS constructs an action improvement recommendation including one or more specific proposed changes to the characteristics of the proposed action. The improvement recommendation may include information on the expected results of the original proposed action and the proposed improved action, including changes to one or more incident resolution parameters. At S280, the IRIS may transmit the improvement recommendation to the action evaluation requestor and/or the incident manager.

Figure 8:
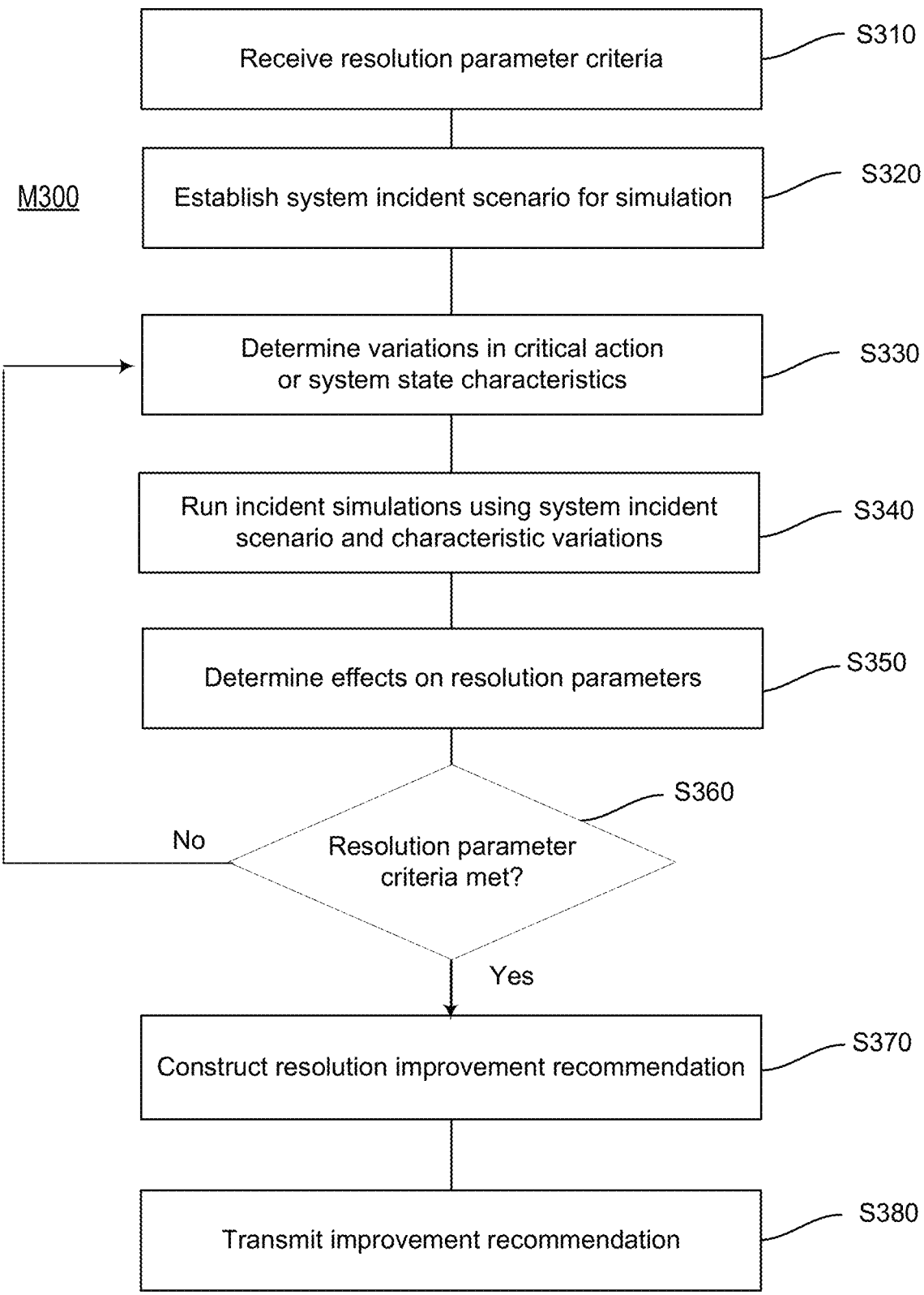
FIG. 8 is a flow chart of actions in a method of optimizing action and system state characteristics for incident resolution efforts according to an embodiment of the invention.

FIG. 8 illustrates a method M300 for optimizing action and system state characteristics for incident resolution efforts. While the method M300 will be described in the context of system 100 of FIG. 1, it will be understood that the method M300 may be implemented on other incident resolution arrangements as well. At S310 of the method M200, an incident resolution improvement server receives a set of criteria for evaluating incident resolution based on multiple resolution parameters. Such resolution parameters may include, for example, duration of incident resolution (i.e., the time required to achieve resolution of the incident), incident resolution cost, and measurable effects on system availability to users (e.g., account holders or other customers). In some embodiments, the criteria may include ranges of acceptability or desirability for each resolution parameter. At S320, the IRIS may establish a system incident scenario for simulation. The incident scenario may be hypothetical or may replicate some or all of the characteristics of an actual system incident. The incident scenario may include identification of a particular system or systems, the initial state of the system or systems, and a set of incident characteristics describing the nature of the incident. In some embodiments, the incident scenario may also include information on expected or actual critical actions taken to resolve the incident. In other embodiments, an initial simulation may be run using a previously established incident resolution machine learning model to determine, based on the historical incident response information, an expected timeline of actions taken to resolve the incident. The incident scenario may also include information on the ultimate resolution (actual or simulated) of the incident, including information on the resolution parameters of interest. At S330, the IRIS identifies a combination of critical action and/or system state characteristics for variation and variation ranges for each. At S340, the IRIS uses the characteristic variations to run a plurality of incident simulations. At S350, the IRIS evaluates the output of these simulations and determines the effect of the variations on the resolution parameters of interest. At S360, the IRIS determines whether any of the simulated combinations meets the resolution parameter criteria. If not, the IRIS may return to S330 and use the simulation results and the machine learning model to determine a new set of characteristic variations. New simulations are run, the results are evaluated and compared to the resolution criteria. The actions at S330, S340, S350 and S360 may be repeated as required until the resolution parameter criteria are met. At this point, the set of characteristic changes that results in the criteria being met may be referred to as the optimized characteristic change set.

If, at S360, the resolution criteria are determined to have been met, the IRIS may, at S370, construct a resolution process improvement recommendation that identifies the optimized characteristic change set. The resolution recommendation may also include information on the expected results applying the optimized characteristic changes, including the effects on the incident resolution parameters of interest. In some embodiments, the improvement recommendation may also include information showing the effects of variations of individual characteristics. At S380, the IRIS may transmit the improvement recommendation to one or more of an improvement evaluation requestor, an incident manager, a system manager, and other incident resolution stake holders.

The systems and methods of the invention provide tools for improving the efficiency of both automated and human resources in resolving major enterprise system incidents. This is accomplished by using historical data and machine learning to identify changes in target system operating characteristics and/or changes to the characteristics of the actions taken in furtherance of incident resolution. Embodiments of the invention can be used to determine optimum combinations of procedures, resources, and operating characteristics to meet desired resolution results.

The present invention provides a method and system for authentication of symmetric encryption communications in which message authentication codes may be produced based on shared secret salt values that may be dynamically generated in parallel from a master key generated by a third party system. The result is more secure communication and construction of the shared data required for symmetric encryption communication.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:

1. An automated system for facilitating resolution of an incident, the system comprising:
    a data storage unit having stored therein incident response information for each of a plurality of system incidents, the incident response information for each incident including incident characteristics, system status information, characterization and timing of critical actions taken to resolve the incident, and description and timing of resolution of each such critical action and overall resolution of the incident; and
    an incident resolution improvement data processor configured to:
        retrieve incident response information from the data storage unit,
        construct a machine learning model using the incident response information stored in the data storage unit, the machine learning model being configured for use in simulating system incident response,
        establish a system incident scenario including a set of scenario incident characteristics, scenario system status, and a set of scenario critical action records, each record including information on a scenario critical action including action characteristics, timing and resolution,
        use the machine learning model to run one or more simulations of the system incident scenario using the scenario incident characteristics and the critical action characteristics, each of the one or more simulations including at least one variation of a first selected critical action characteristic from the scenario incident characteristics or the critical action characteristics and each of the one or more simulations producing a first simulated incident resolution parameter result,
        iterate the running of one or more simulations for variation of a second selected critical action characteristic from the scenario incident characteristics or the critical action characteristics, each iteration generating a second simulated incident resolution parameter result; and
        optimize the variations that maximize both the first and second simulated incident resolution parameter result when compared to a predetermined improvement criteria.

2. An automated system according to claim 1 wherein the incident resolution improvement data processor is further configured to:
    determine a proposed action based on the one or more of the at least one variation, and
    determine an expected improvement in an incident resolution parameter corresponding to the simulated incident resolution parameter based on implementing the proposed action.

3. An automated system according to claim 2 wherein the incident resolution improvement data processor is further configured to:
    transmit, to one or more user processors over a network, incident response improvement information including the proposed action and the expected improvement in the incident resolution parameter.

4. An automated system according to claim 2 wherein the incident resolution improvement data processor is further configured to:
    communicate with one or more components of an incident response data processing system over a network,
    identify, from the one or more components, a particular component for carrying out the proposed action, and
    transmit, to particular component, an action implementation command comprising instructions to carry out the proposed action.

5. An automated system according to claim 1 wherein the system incident scenario is established based on the incident response information for one of the plurality of incidents.

6. An automated system according to claim 5 wherein the simulated incident resolution parameter is a simulated total incident resolution time interval and the predetermined criteria includes a minimum reduction in the simulated total incident resolution time interval as compared to an actual total incident resolution time for the one of the plurality of incidents.

7. An automated system according to claim 5 wherein the incident resolution improvement data processor is further configured to:
- determine an application processing system associated with the one of the plurality of incidents,
- obtain current system status information for the application processing system, and
- prior to running the one or more simulations, replace the system status information for the one of the plurality of incidents with the current system status information.

8. An automated method of facilitating incident resolution, the method comprising:
- obtaining, by an incident resolution improvement processor, incident response information for each of a plurality of system incidents, the incident response information for each incident including incident characteristics, system status information, characterization and timing of critical actions taken to resolve the incident, and description and timing of resolution of each such critical action and overall resolution of the incident;
- building, by the incident resolution improvement processor, a machine learning model using the incident response information, the machine learning model being configured for simulating incident response;
- establishing, by the incident resolution improvement processor, a system incident scenario including a set of scenario incident characteristics, scenario system status, and a set of scenario critical action records, each record including information on a scenario critical action including action characteristics, timing and resolution;
- using the machine learning model by the incident resolution improvement processor to run one or more simulations of the system incident scenario using the scenario incident characteristics, scenario system status, and information from the scenario critical action records, each of the one or more simulations including at least one variation of a first selected critical action characteristic from the scenario critical actions in the scenario critical action records and each of the one or more simulations producing a first simulated incident resolution parameter;
- iterating the running of one or more simulations for variation of a second selected critical action characteristic from the scenario incident characteristics or the critical action characteristics, each iteration generating a second simulated incident resolution parameter result; and
- optimizing the variations that maximize both the first and second simulated incident resolution parameter result when compared to a predetermined improvement criteria.

9. An automated method according to claim 8 further comprising:
- determining, by the incident resolution improvement processor, a proposed action based on the one or more of the at least one variation; and
- determining an expected improvement in an incident resolution parameter corresponding to the simulated incident resolution parameter based on implementing the proposed action.

10. An automated method according to claim 9 further comprising:
- transmitting, to a manager processing system, an incident response improvement recommendation including the proposed action and the expected improvement in the incident resolution parameter.

11. An automated method according to claim 9 further comprising:
- transmitting, by the incident resolution improvement processor to a data processing component of an incident resolution system, an action implementation command comprising instructions to carry out the proposed action.

12. An automated method according to claim 8 wherein the system incident scenario is established based on the incident response information for one of the plurality of incidents.

13. An automated method according to claim 12 wherein the simulated incident resolution parameter is a simulated total incident resolution time interval and the predetermined criteria includes a minimum reduction in the simulated total incident resolution time interval as compared to an actual total incident resolution time for the one of the plurality of incidents.

14. An automated method according to claim 12 further comprising:
- determining, by the incident resolution improvement processor, an application processing system associated with the one of the plurality of incidents,
- obtaining, by the incident resolution improvement processor, current system status information for the application processing system; and
- prior to running the one or more simulations, replacing, by the incident resolution improvement processor, the system status information for the one of the plurality of incidents with the current system status information.

15. An automated method according to claim 9 wherein the proposed action is or includes at least one of the set consisting of:
- a change in personnel responsible for carrying out the selected critical action,
- a change in team responsibility for carrying out the selected critical action, and
- a change in system resources used to carry out the selected critical action.

16. An automated method according to claim 8 wherein the at least one variation of a selected critical action characteristic is or includes at least one of the set consisting of:
- a change in personnel responsible for carrying out the selected critical action,
- a change in team responsibility for carrying out the selected critical action, and
- a change in system resources used to carry out the selected critical action.

17. An automated data processing system for facilitating improvements to an incident resolution system, the system comprising:
- a scenario construction processor configured for establishing a system incident scenario including a set of scenario incident characteristics, scenario system status, and a set of scenario critical action records, each record including information on a scenario critical action including action characteristics, timing and resolution,
- a machine learning model constructed using incident response information for each of a plurality of incidents, the machine learning model being configured for use in simulating system incident response;
- a simulation processor configured to:
  - use the machine learning model to run one or more simulations of the system incident scenario using the scenario incident characteristics, scenario system status, and information from the scenario critical action records, each of the one or more simulations including at least one variation of a first selected critical action characteristic from the scenario critical actions in the scenario critical action records and each of the one or more simulations producing a first simulated incident resolution parameter; and iterate the running of one or more simulations for variation of a second selected critical action characteristic from the scenario incident characteristics or the critical action characteristics, each iteration generating a second simulated incident resolution parameter result; and an improvement evaluation processor configured to optimize the variations that maximize both the first and second simulated incident resolution parameter result when compared to a predetermined improvement criteria.

18. An automated data processing system according to claim 17 wherein the incident response information for each of the plurality of system incidents includes incident characteristics, system status information, characterization and timing of critical actions taken to resolve the incident, and description and timing of resolution of each such critical action and overall resolution of the incident.

19. An automated data processing system according to claim 17 wherein the improvement evaluation processor is further configured to:

determine a proposed action based on the one or more of the at least one variation, and determine an expected improvement in an incident resolution parameter corresponding to the simulated incident resolution parameter based on implementing the proposed action.

20. An automated system according to claim 19 wherein the incident resolution improvement data processor is further configured to:

transmit, to one or more user processors over a network, incident response improvement information including the proposed action and the expected improvement in the simulated incident resolution parameter.

* * * * *